April 25, 1933. A. J. BLAIVAS 1,905,362
AMPOULE
Filed Dec. 23, 1932
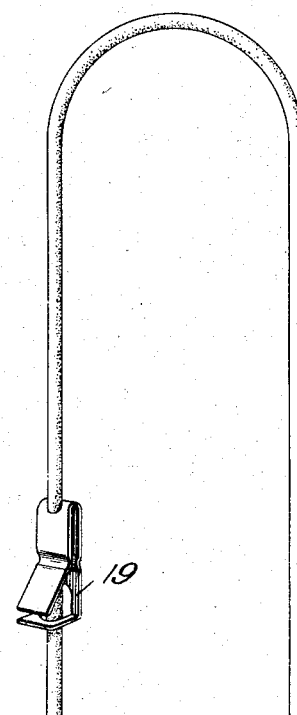

Patented Apr. 25, 1933

1,905,362

UNITED STATES PATENT OFFICE

ABRAHAM J. BLAIVAS, OF BROOKLYN, NEW YORK

AMPOULE

Application filed December 23, 1932. Serial No. 648,697.

The present invention relates to containers and more particularly to ampoules for medicinal liquids or solutions.

An important object of the invention is the provision of a sealed ampoule having integral therewith a device, such as a hook, by which the ampoule can be supported.

Another object of the invention is to provide an ampoule which has elongated stems at both ends for facilitating the sealing of the ampoule and the breaking of the seals.

A further object of the invention is generally to provide an ampoule of improved construction.

These and other objects of the invention which might hereinafter appear are attained in the constructions herein disclosed as the preferred embodiments of the invention.

In the accompanying drawing, forming a part of this specification:

Fig. 1 is side view of a sealed ampoule embodying the present invention;

Fig. 2 is a view of the ampoule shown in Fig. 1, with the seals broken and the ampoule supported for use and connected to an injection device; and Fig. 3 is a side view of a sealed ampoule like that shown in Fig. 1 but of different shape.

The ampoule shown in Fig. 1 is made of glass and comprises a tubular body portion or container 10 and elongated reduced extensions or stems 11 and 12 sealed at their ends by fused seals 13 and 14, respectively. Said stems 11 and 12 have passages 15 and 16 which communicate with the interior of the body portion 10 so that, after the seals are broken, the liquid can flow freely from the ampoule when the latter is employed in the gravity method of injection.

The outlet stem 11 is preferably straight to facilitate the attachment of the rubber tube 17 of an injection device. Said tube 17 is connected in any suitable way to an injection needle 18 and is provided with an adjustable clamp 19 for controlling the flow of the liquid from the ampoule.

The stem 12 is preferably hook-shaped whereby the ampoule can be suspended conveniently from any suitable support, here shown as a hook 20.

Said stems 11 and 12 can be formed on the body portions 10 in any suitable way, as by being drawn from the body portion or by fusing initially separate stem members to the ends of said body portion.

The ampoule 10a shown in Fig. 3 is similar in construction to the ampoule 10 and like the latter has tubular stems 11a and 12a sealed at their ends 13a and 14a. The ampoules 10 and 10a differ from each other only in shape. The walls of the ampoule 10a taper toward the outlet stem 11a. Thus the ampoule 10a can be supported by a ring support. Also, when desired, it can be suspended by its hook stem 12a, like the ampoule 10, in the manner illustrated in Fig. 2. The stems 12 and 12a not only serve as means for suspending the ampoules from a support but also constitute handles which facilitate carrying and otherwise handling these ampoules.

As is obvious, ampoules embodying the present invention may vary in size. At present, these ampoules are particularly useful in sizes of 250 c. c. and 500 c. c. capacities, although they may be of other sizes, either smaller or larger than the two sizes mentioned.

The ampoule and the contents sealed therein are furnished for use in hospitals and for use generally by members of the medical profession. When it is desired to use the ampoule, the seals are broken and the rubber tube of the injection device is attached to the outlet stem. The needle is then injected into the patient and the clamp may be operated to regulate the flow of the solution. The ampoule, including its contents and the injection device, is sterilized and therefore is always ready for immediate use.

While I have described the preferred embodiments of my invention, it will be understood that certain changes may be made and, in view of the present disclosure, will occur to those skilled in the art. Therefore, I do not wish to be limited to the precise forms of the invention shown, except as may be required by the appended claim and the prior art.

Having thus described my invention, what I claim is:

A normally sealed ampoule comprising an elongated tubular glass container having an integral hook at its upper end, said hook and said elongated container being constructed and arranged to permit said ampoule to be suspended from a support, said hook having a passage in communication with the interior of said container and provided with a breakable seal, and a straight tubular stem integral with said container adapted to receive a flexible tube and extending from the bottom thereof, said stem having a breakable seal whereby the contents of said container can flow freely by gravity through said stem when the seals of said stem and said hook are broken.

In witness whereof, I have signed my name to the foregoing specification.

ABRAHAM J. BLAIVAS.